(12) United States Patent
Bella

(10) Patent No.: US 6,181,775 B1
(45) Date of Patent: Jan. 30, 2001

(54) DUAL TEST MODE NETWORK INTERFACE UNIT FOR REMOTE TESTING OF TRANSMISSION LINE AND CUSTOMER EQUIPMENT

(75) Inventor: Gregory L. Bella, Naperville, IL (US)

(73) Assignee: Westell Technologies, Inc., Aurora, IL (US)

( * ) Notice: Under 35 U.S.C. 154(b), the term of this patent shall be extended for 0 days.

(21) Appl. No.: 09/307,871

(22) Filed: May 10, 1999

Related U.S. Application Data (63) Continuation-in-part of application No. 09/199,562, filed on Nov. 25, 1998.

(51) Int. Cl.[7] .............................. H04M 1/24; H04M 3/08; H04M 3/22
(52) U.S. Cl. .................................. 379/29; 379/1; 379/5; 379/9; 379/22; 379/29
(58) Field of Search ................................. 379/1, 5, 9, 22, 379/27, 29

(56) References Cited

U.S. PATENT DOCUMENTS

| | | | | |
|---|---|---|---|---|
| 4,641,299 | * | 2/1987 | Kemper et al. | 379/29 |
| 4,791,659 | * | 12/1988 | Ross | 379/22 |
| 5,166,925 | * | 11/1992 | Ward | 379/27 |
| 5,345,496 | * | 9/1994 | Galpin | 379/29 |
| 5,353,327 | * | 10/1994 | Adari et al. | 379/22 |
| 5,384,822 | * | 1/1995 | Brown et al. | 379/10 |
| 5,471,517 | * | 11/1995 | Nakagwa | 379/1 |
| 5,553,059 | * | 9/1996 | Emerson et al. | 379/5 |
| 5,604,785 | * | 2/1997 | Pryor et al. | 379/2 |
| 5,636,260 | | 6/1997 | Chopping | 379/5 |
| 5,835,565 | * | 11/1998 | Smith et al. | 379/5 |
| 6,005,921 | * | 12/1999 | Keefe et al. | 379/27 |
| 6,014,425 | * | 1/2000 | Bingel et al. | 379/27 |

* cited by examiner

Primary Examiner—Curtis A. Kuntz
Assistant Examiner—Quoc D. Tran
(74) Attorney, Agent, or Firm—Pennie & Edmonds LLP

(57) ABSTRACT

A network interface device intended to be placed approximate to the customers equipment and remote from a central office of a telephone company ("TELCO"). The purpose of the network interface device is to allow the twisted pair transmission line between the central office and the customer's port to be selectively switched from a normal monitoring mode into a test mode. The test mode has two phases. In the first phase, the NIU transmits a signal back to the central office. This allows the central office to determine whether there are any problems with the transmission line, the potential bandwidth for the transmission line and related parameters concerning the efficacy and suitability of the transmission line for a variety of communication services. In the second phase, which is entered into upon completion of the first phase, the customer-end ADSL low pass filter is bypassed so that the central office can test the customer's POTS equipment.

17 Claims, 11 Drawing Sheets

DUAL TEST MODE NETWORK INTERFACE UNIT FOR REMOTE TESTING OF TRANSMISSION LINE AND CUSTOMER EQUIPMENT

RELATED APPLICATIONS

This application is a continuation-in-part of application Ser. No. 09/199,562, filed Nov. 25, 1998.

TECHNICAL FIELD

The present invention is directed to remotely monitoring and evaluating a twisted pair transmission line, such as that used in telephone line communication. It is especially directed to communication systems, such as an asynchronous digital subscriber line ("ADSL") which use a telephone line for communication between a customer and a central office.

BACKGROUND OF THE INVENTION

Asymmetric Digital Subscriber Line (ADSL) is a technology which allows for simultaneous voice and data traffic to coexist over a communication channel comprising a standard telephone transmission line. Typically, the standard telephone transmission lines comprise an unshielded twisted pair of copper wire having a gauge of 22–26AWG. Twisted pairs, which can be used to connect a central telephone system (a 'central' unit) to a subscriber's telephone (a 'remote' unit) can support bandwidths of up to 2 MHz through the use of digital signal processing (DSP) technology. Thus, they can be used for bandwidth-intensive applications, such as internet access and video-on demand, as well as for carrying voice traffic. Frequency division multiplexing is used so that a plurality of signals, each occupying a different frequency band, can be simultaneously sent over the same transmission line.

The voice traffic band comprises a number of frequency sub-bands, or channels, ranging from DC to 20 KHz. The analog voiceband frequency is typically specified as 200–4000 Hz. Customer specified additions may include phone operation up to 8 KHz and 12–16 KHz billing tones. In addition, DC to 30 Hz frequencies are typically assigned for auxiliary analog signaling purposes, such as ringing the telephone, dial pulsing and on/off hook signaling.

ADSL data traffic bandwidth for CAP (carrierless amplitude and phase) modulation is typically from 35 KHz–1.5 MHZ. Of this, upstream data traffic (i.e., remote unit to central unit) uses the 35 KHz–191 KHz band, while the downstream traffic (i.e., central unit to remote unit) uses the 240 KHz–1.5 MHZ band.

Before providing the customer with ADSL service, the telephone company ("TELCO") must determine whether the line is suitable for ADSL communication. This is typically done by testing the lines between the TELCO's central office or substation, and the customer's site. In cases where the ADSL service is provided to the customer's residence, this often means testing the line at the point of entry to the building in which the customer's dwelling is located. After initiation of ADSL service, there are occasions in which the customer experiences problems in ADSL communication. In those instances, then TELCO must determine whether the trouble lies with the TELCO's equipment or with the customer's equipment. To make this determination, a TELCO representative may visit the customer's site to test whether the twisted pair line from the customer's site to the TELCO central office or substation is working properly, and also to test whether the customer's equipment is working properly. This requires considerable expense due to the time taken by the repairman.

SUMMARY OF THE INVENTION

The present invention is directed to an apparatus and method for remotely testing the TELCO's ADSL equipment, without having to travel to the customer's site. It uses an interface unit which is installed proximate to the customer's equipment, which can be selectively operated from a remote location to test the TELCO's ADSL equipment. A device in accordance with the present invention is installed between the customer's port and the TELCO's port at the point where the line enters the customer's site.

A device in accordance with the present invention operates in one of two modes: a monitor mode and a test mode. In the monitor mode a subcircuit of the device looks for a request signal asking the device to switch from the monitor mode to the test mode. When a valid request signal is received from the central office on the twisted pair, the device is switched into the test mode. The test mode has two phases. In the first phase, a signal generator of the device isolates the customer equipment and transmits a test signal from the unit back to the central station on the twisted pair. A timer circuit associated with the device allows this first phase to proceed for a predetermined period of time. In the second phase, the device isolates customer-end filter circuitry so as to directly test the customer's POTS equipment. The device includes a voltage regulator which provides an operating voltage for the remaining components and sub-circuits of the device.

BRIEF DESCRIPTION OF THE DRAWINGS

The present invention can better be understood through the attached figures in which.

DETAILED DESCRIPTION OF THE PREFERRED EMBODIMENT

Figure 1:
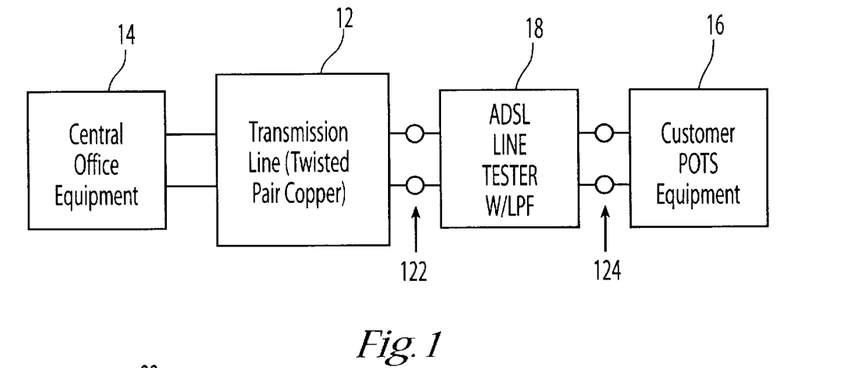
FIG. 1 presents a block diagram of an ADSL system incorporating a network interface unit.

FIG. 1 shows an ADSL system 10 which incorporates a device in accordance with the present invention. The ADSL system 10 comprises a transmission line 12 which extends between a central office 14 and a customer's site 16. In addition, the ADSL system 10 includes a network interface unit 18 (NIU) which is physically located near the customer's equipment 16 and interfaces the customer equipment to the transmission line 12.

As shown in the figures, the network interface unit 18 is dual ported with one side connected to a network interface port 22 and the other side connected to the customer port 24. The purpose of locating a network interface unit close to the customer's site is to allow the central office 14 to test whether its transmission equipment and the transmission line 12 are functioning properly without having to visit the customer's site. This testing is made possible by the design and function of the Network Interface Unit.

Figure 2:
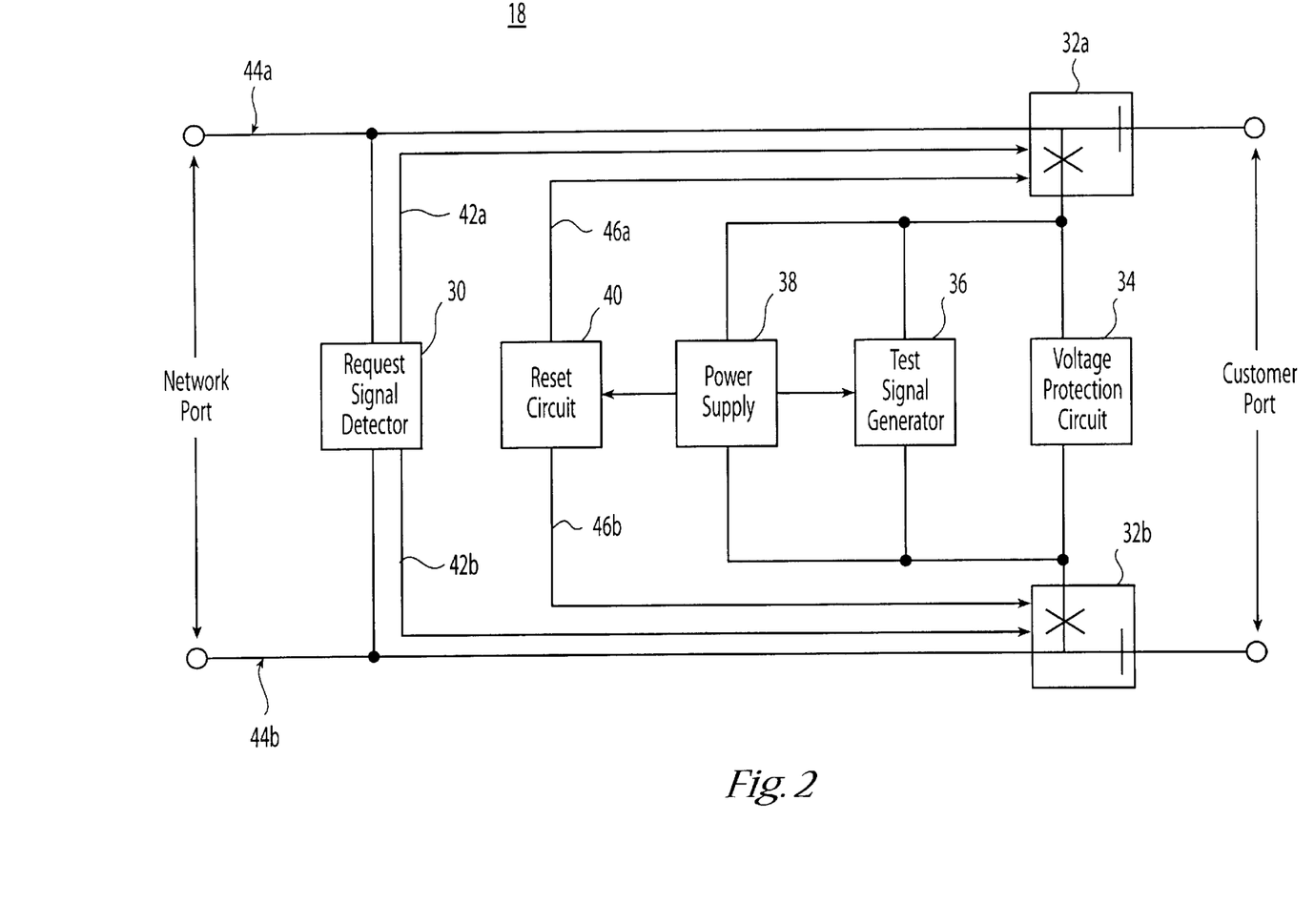
FIG. 2 presents a block diagram of an embodiment of a network interface unit.
Figure 5:
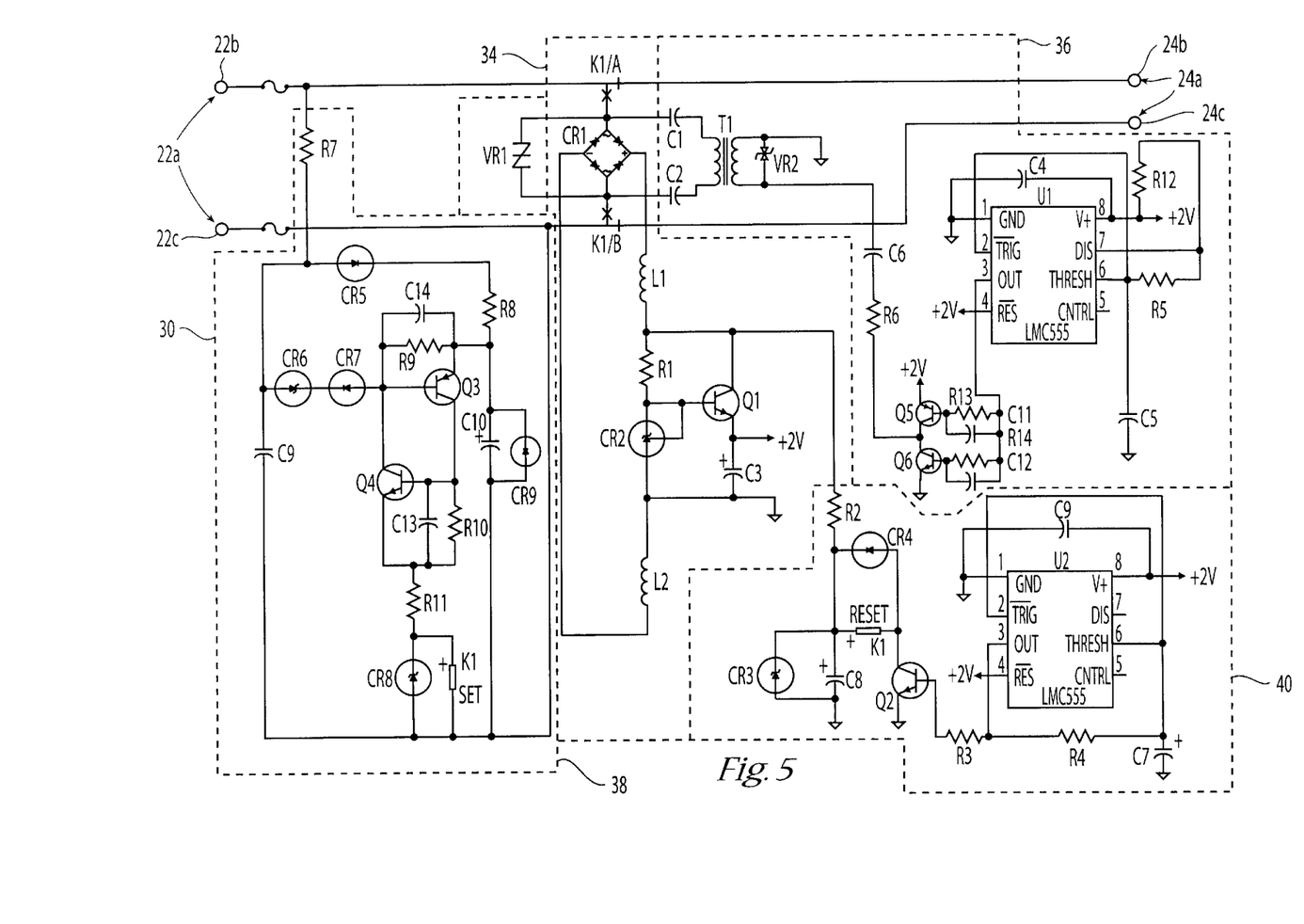
FIG. 5 presents a detailed diagram of the network interface unit of FIG. 2.

FIG. 2 shows a functional block diagram of the NIU. As seen in FIG. 2, the NIU comprises a request signal detector 30, a pair of line-control switches 32a, 32b, a voltage protection circuit 34, a test signal generator 36, a power supply 38, and a reset control circuit 40. As seen in FIG. 5, the NIU has a first port 22a comprising terminals 22b, 22c on the network side and a second port 24a comprising corresponding terminals 24b, 24c on the customer side.

The request signal detector 30 is a high impedance circuit connected across the network port which is configured to detect a valid request signal sent by the central office. The request signal may take any number of forms. For instance, it could be a coded sequence of pulses sent from the central office. Alternatively, it may be a signal having predetermined spectral and amplitude characteristics. In the preferred embodiment, however, the request signal is a battery reversal condition having a predetermined duration. Once the detector 30 recognizes that a valid request signal has been received, it outputs a first control signal on lines 42a, 42b, in order to switch the NIU from the monitor mode to the test mode.

Switches 32a and 32b connect the voltage nodes 44a, 44b at the network side port 22a to the customer side port 24a, when the NIU is in the monitor mode. Thus, in the monitor mode the presence of the NIU is transparent to the customer equipment and the central office only sees a high impedance monitor circuit 18a shunted across the transmission lines 12. Upon receiving the first control signal on lines 42a, 42b from the request signal detector 30, the switches 32a, 32b break the connection between the network port to the customer port, and instead establish a connection to the circuitry of the NIU to form a test circuit 18b. Because switches 32a, 32b are activated at the same time in response to receipt of a valid request signal, the switches 32a, 32b may be implemented as a single double-pole double-throw electronic switch which selectively connects a pair of input lines to either of two pairs of output lines. Whether in the monitor mode or in the test mode, the terminals 22b, 22c of the network side port 22a serve as first and second voltage nodes having an input voltage therebetween.

When switches 32a, 32b are toggled into the test mode, other components of the NIU are activated. First, the voltage protection circuit 34 is activated and serves to prevent an over voltage condition across the transmission line which might otherwise destroy the NIU. In addition, the power supply 38 is activated and outputs a DC operating voltage $V_s$ which is used to drive the test signal generator 36 and the reset control circuit 40. The NIU's power supply 38 draws its power from the office battery voltage. Therefore, the power supply 38 does not need to be provided with a local battery or other power source.

The test signal generator 36 outputs a signal and this signal is sent down the transmission line 12 back to the central office. The test signal maybe a narrow band tone, a broad band sweep or may take on any of an infinite number of spectral characteristics. The test signal's waveform may be sinusoidal, triangular, a square wave, or take on one of any number of different shapes. In the preferred embodiment, however, a 300 KHz square wave is generated by the test signal generator 36 and is received at the central office or other facility for analysis with known equipment such as spectrum analyzers and computers using established analytical techniques. This allows the central office to determine a number of parameters including 300 KHz insertion loss, harmonic insertion loss, return loss, phase distortion and predicted ADSL line data rate.

The reset control circuit 40 serves to return the switches 32a, 32b back to the monitor mode from the test mode after a predetermine lapse of time. Thus, the reset control circuit 40 limits the duration that the test signal is sent to the central office. This duration must be of sufficient length to allow the central office to assess the performance of the ADSL system between the central office to the customer's port. In the preferred embodiment, the reset control circuit allows the test signal generator to send a signal for the predetermined period of time of 30 seconds. At the end of this period, the reset control circuit 40 sends a reset control signal on lines 46a, 46b to switches 32a, 32b respectively. In response to the reset control signal, the switches 32a, 32b reconnect the network port to the customer port, and disable the test signal generator and other components of the NIU.

FIG. 5 shows an embodiment of an NIU. It is first noted in FIG. 5 that the switches of FIG. 2 are implemented by means of dual pole double throw latching relay whose contacts are designated K1/A and K1/B, both contacts being simultaneously activated in response to a signal received at one of two coils associated with the relay—a "set" coil and a "reset" coil. Each contact of the relay K1 selectively connects one member of the twisted pair to a corresponding element. In the monitor mode, the relay connects the network side port 22a with the customer side port 24a. Under these conditions the voltage protection circuit 34, the test signal generator 36, the power supply 38, and the reset control circuit 40 are all disabled. However the request signal detector 30 is always enabled and monitors the signal coming on the transmission line.

As seen in FIG. 5, the request signal detector 30 provides an input impedance of R7 plus the collective impedance of the remainder of a circuit comprising the detector 30. As shown in Table 1, R7 is preferably 2 MHz and so in the monitor mode, the input impedance of the NIU is at least 2 MΩ. Such an impedance level meets the requirements of some telephone companies, although a lower impedance level of, say, 500 KΩ meets the requirements of other telephone companies. Regardless of the input impedance due to R7, the time constants formed by R7, C9 and R8, C10 are selected to filter out a 20 Hz ringing signal so that the request signal detector does not false trigger due to the voltage reversal associated with a ringing signal.

As is known to those skilled in the art, the central office outputs a quiescent transmission line battery voltage of a predetermined polarity across the twisted pair 12. The magnitude of the voltage is nominally 48 volts, although it may vary from between 42–65 volts. The transmission line battery voltage is used by the NIU both to trigger the request signal detector as well as power the remaining circuitry of the NIU. In the preferred embodiment, the request signal detector triggers on a reverse voltage condition, e.g., −48 volts, on the twisted pair for a predetermined period of time. The circuit of FIG. 5 requires a reverse voltage condition of at least 1.5 seconds, although the circuit can easily be configured to respond to some other minimum duration. Thus, to switch from the monitor mode to the test mode, the central office outputs a request signal comprising a reverse voltage of this duration on the twisted pair 12.

When in the monitor mode, capacitors C9 and C10 charge up to the quiescent transmission line DC voltage (typically a 48 volt feed from the central office). Therefore, the voltage at PNP transistor Q3's emitter and base are also at the quiescent transmission line DC voltage and so Q3 initially does not conduct. When a reverse battery condition occurs, C10 cannot discharge due to diode CR5. However, under the reverse voltage condition, capacitor C9 first discharges through R7 and, due to the reverse voltage, then begins to charge with a polarity opposite to that of C10. C10, however, does not discharge under the reverse voltage condition because of bypass diode CR9. When the voltage difference between C10 (which remains at about 48 volts during the reverse voltage condition) and C9 exceeds the Zener voltage of CR6 (51 volts in the preferred embodiment), Q3 begins to go into the active region. Since Q3's collector is connected to Q4's base, Q4 also becomes active. When transistor Q4 turns on, its collector current causes Q3 to turn on even harder, sending both transistors into saturation. This results in C10 discharging through resistor R11 and the SET coil of the relay K1. After approximately 2 ms, the relay K1 sets, thereby disconnecting the customer from the transmission line 12 and engaging the test circuit.

Once relay K1 has been set by detector 30, the remainder of the NIU is activated. The voltage protection circuit 34 comprises clamping circuit VR1 which acts as an open circuit at voltages below ±100 volts. When the voltage between the twisted pair 12 exceeds ±100 volts, clamping circuit acts as a short circuit between relay contacts K1/A and K1/B. When the current through the relay drops below the holding current, the clamping circuit once more becomes an open circuit.

The power supply 38 includes a bridge circuit CR1 arranged in electrical parallel with the voltage protection circuit 34. When the relay K1 is set, bridge circuit CR1 begins to conduct and provides a current through inductor L1. The current then flows through resistor R1 and into base lead of NPN transistor Q1. Because the base-collector voltage is reversed biased, transistor Q1 begins to conduct with a current flowing through capacitor C3 and inductor L2 back to the bridge circuit CR1. In the course of charging up C3, the positive node of C3 connected to the emitter of Q1 reaches a level of +2 volts. This level of +2 volts is maintained so long as the relay K1 is set and some voltage of either polarity is provided at the first port. Thus, the emitter voltage of Q1, where it connects to capacitor C3, is kept steady at +2 volts, and this voltage is tapped to provide the input voltage to drive the remainder of the NIU circuit. CR2 is preferably implemented as a TL431 and serves to ensure that the base-emitter voltage of Q1 never exceeds a predetermined value, thereby regulating the voltage and Q1's emitter. Inductors L1 and L2 isolate the remainder of the power supply 38 from the signal generator 36 by effectively blocking AC signals. Thus, in the present invention, the power supply is run off of the line voltage of the twisted pair, onto which a signal from the test signal generator is placed.

The test signal generator in the preferred embodiment is implemented by means of a LMC555 timer U1. This timer is configured to output a square wave having a frequency of 300 KHz. The frequency output by the timer is determined selected by the specific values of R12, R5 and C5. In the preferred embodiment, the 300 KHz frequency is used because it is a standard frequency used to benchmark ADSL system performance. However, if desired, other frequencies above 35 KHz can also be used as the test signal.

The output of the LMC555 timer U1 is sent to an output driver formed by transistors Q5, Q6, current limiting base resistors R13, R14 and speed-up capacitors C11 and C12 which preserve charge to quickly turn on/turn off Q5 and Q6. The output driver is used to insulate the output pin of the 555 timer from the impedance load of transistor T1

The output driver acts as a trigger which outputs a signal acceptable for transmission back to the central office. In this instance, the test signal generated by the output driver passes through R6 and C6 before it is applied to transformer T1 prior to transmission. The test signal then passes through AC coupling capacitors C1, C2 which block DC, before the test signal is applied to the transmission line via relay contacts of relay K1. Voltage protection element VR2 ensures that the signal applied to coil T1 stays below a predetermined value, in this case 5 volts.

The reset control circuit 40 is implemented using a second LMC555 timer U2, and so the reset control circuit and the reset control circuit can be formed from a single 556 dual-timer. In the preferred embodiment of FIG. 5, the LMC555 timer U2 triggers the RESET coil of the relay K1 after 30 seconds. It should be noted, however, that the 30 second value is determined by the specific values used for R4 and C7. After 30 seconds the OUT pin on the 555 timer U2 outputs a signal which passes through base resistor R3 and into the base lead of transistor Q2. This turns on transistor Q2, thereby resetting relay K1. Once relay K1 has been reset, the effect of the signal generator 36 no longer impacts the signal on the transmission line and the transmission line itself returns to the monitor mode in which the request signal detector 30 further awaits a valid request signal.

Table 1 lists the component values of the inductors, resistors and capacitors in the circuit of FIG. 5, while Table 2 provides information about the remaining components.

TABLE 1

Component Values for Inductors, Resistors & Capacitors in Filter Circuit of FIG. 5

| COMPONENT | VALUE |
|---|---|
| L1, L2 | 470 uH |
| R1 | 20 KΩ |
| R2 | 50 KΩ |
| R3 | 1200 Ω |
| R4 | 1 MΩ |
| R5 | 18 KΩ |
| R6 | 100 Ω |
| R7 | 2 MΩ |
| R8 | 100 KΩ |
| R9 | 249 KΩ |
| R10 | 249 KΩ |
| R11 | 100Ω, ½W |
| R12 | 1 KΩ |
| R13, R14 | 5 KΩ |
| C1, C2 | 0.068 μF |
| C3 | 100 uF |
| C4 | 0.1 uF |
| C5 | 100 pF |
| C6 | 0.1 uF |
| C7 | 20 uF |
| C8 | 100 uF |

TABLE 1-continued

Component Values for Inductors, Resistors & Capacitors in Filter Circuit of FIG. 5

| COMPONENT | VALUE |
| --- | --- |
| C9 | 1 uF |
| C10 | 47 uF |
| C11 | 200 pF |
| C12 | 200 pF |
| C13, C14 | 0.1 uF |

TABLE 2

Components in Circuit of FIG. 5

| COMPONENT | DESCRIPTION |
| --- | --- |
| CR1 | KBP204G from Diodes, Inc. |
| CR2 | TL431 |
| CR3, CR8 | 1N5229B, 4.3V Zener |
| CR4, CR5, CR7, CR9 | 1N4454 |
| CR6 | 1N4757A 51V Zener |
| VR1 | Part no. P0800EC from Teccor |
| VR2 | 1.5KE10C from Motorola |
| T1 | 651-K427 from Midcom |
| K1 (dual relay) | TQ2E-L2-3V from Aromat |
| Q1, Q2, Q4, Q6 | MPS8099 from Motorola |
| Q3, Q5 | MPS8599 from Motorola |
| U1, U2 | 555 CMOS timers |

The device described above can be used whenever it is desirable to temporarily isolate equipment connected to a twisted pair transmission line for testing purposes. Thus, instead of only being useful for ADSL services, the present device can be used in conjunction with a variety of narrowband and broadband communication systems which use a twisted pair. In such case, changing the signal generator to output different test signals may allow one to test the suitability of the twisted pair for a wide variety of communication services.

Figure 6:
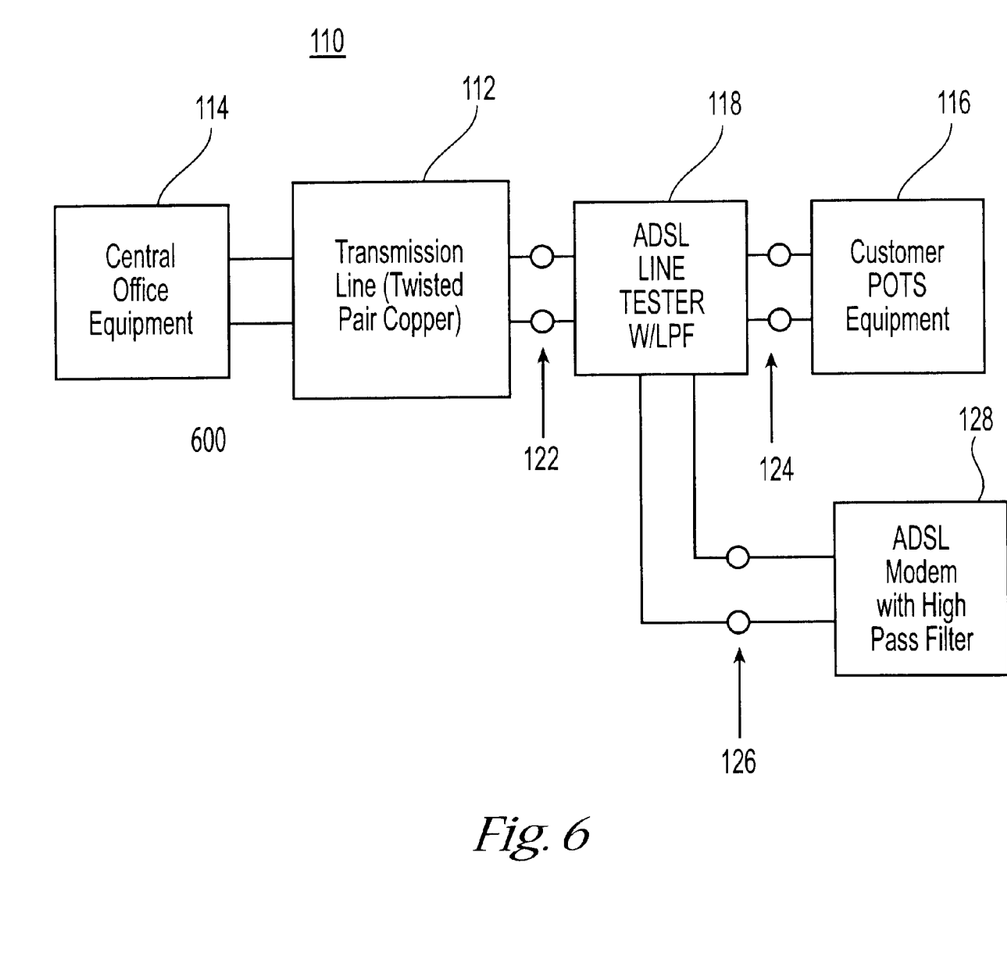
FIG. 6 presents a block diagram of an ADSL system incorporating a network interface unit in accordance with the present invention.

FIG. 6 shows an ADSL system 110 similar to that shown in FIG. 1. The system of FIG. 6 includes central office equipment 114, the twisted pair transmission line 112, network interface port 122, ADSL line tester circuit 118, customer POTS port 124, customer POTS equipment 116 and customer ADSL modem port 126, the last of which connects to an ADSL modem 128.

Figure 7:
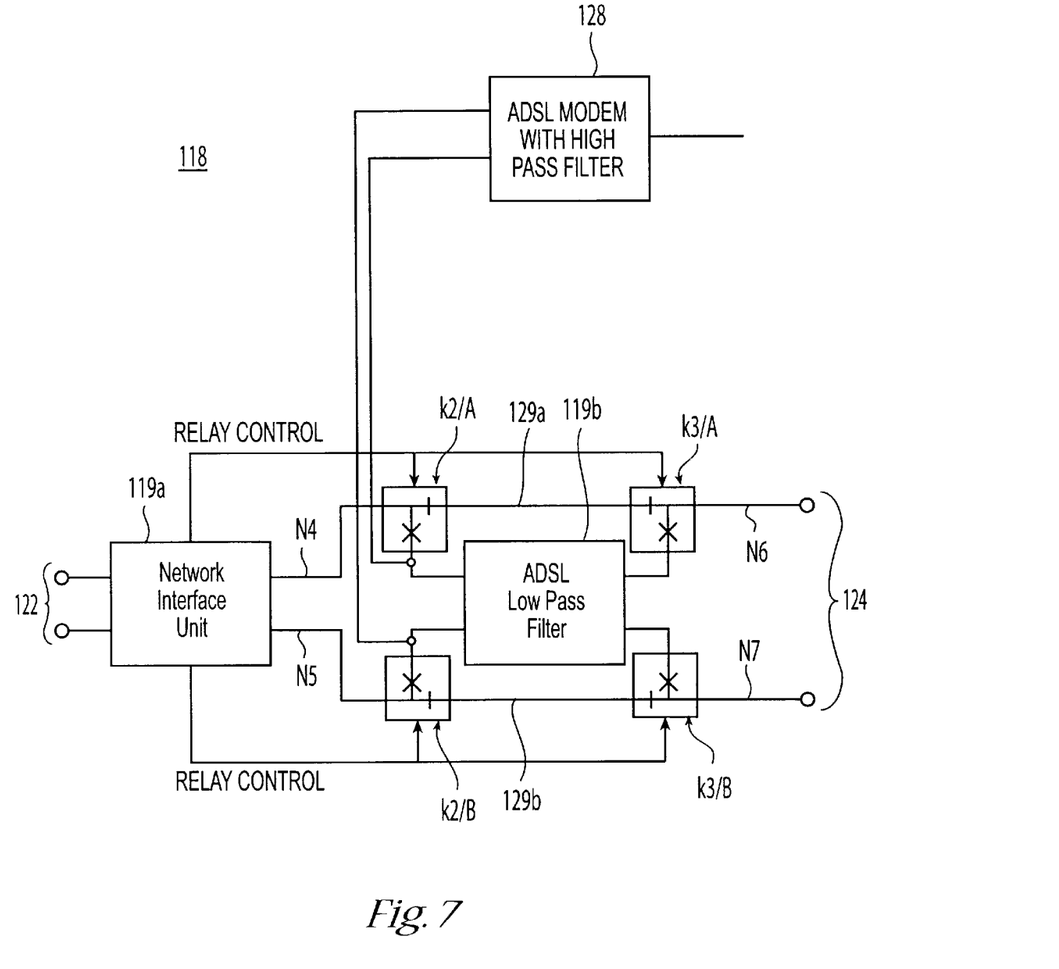
FIG. 7 presents a block diagram of a device in accordance with the present invention.

FIG. 7 shows a block diagram of the ADSL line tester circuit 118 of the present invention. The tester circuit 118 comprises a network interface unit 119a coupled at input nodes N4, N5 and output nodes N6, N7 to a low pass filter 119b via dual contact relays K2 and K3. Relay K2 selectively connects the output of the network interface unit 119a within tester 118 to the twisted-pair side of the ADSL low pass filter 119b and the ADSL modem 128. Relay K3 selectively connects the POTS side of the ADSL low pass filter 119b to the customer POTS port 124. Relay contacts K2/A and K3/A are connected by bypass line 129a while relay contact K2/B and K3/B are connected by bypass line 129b. Therefore, when dual contact relays K2 and K3 are reset, the output of the network interface unit 119a bypasses both the ADSL low pass filter and the ADSL modem, and is directly connected to customer POTS port 124.

Figure 3:
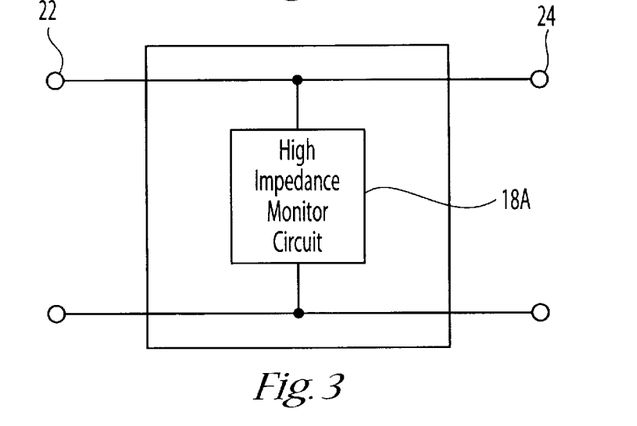
FIG. 3 presents a block diagram of the normal mode in which the network interface unit of FIG. 2 operates.
Figure 4:
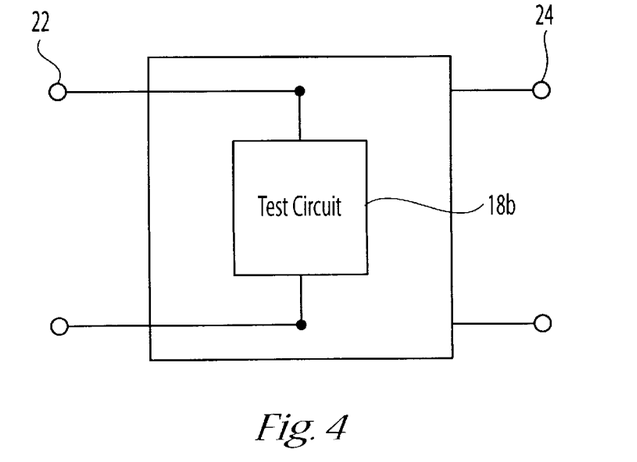
FIG. 4 presents a block diagram of the test mode in which the network interface unit of FIG. 2 operates.
Figure 8:
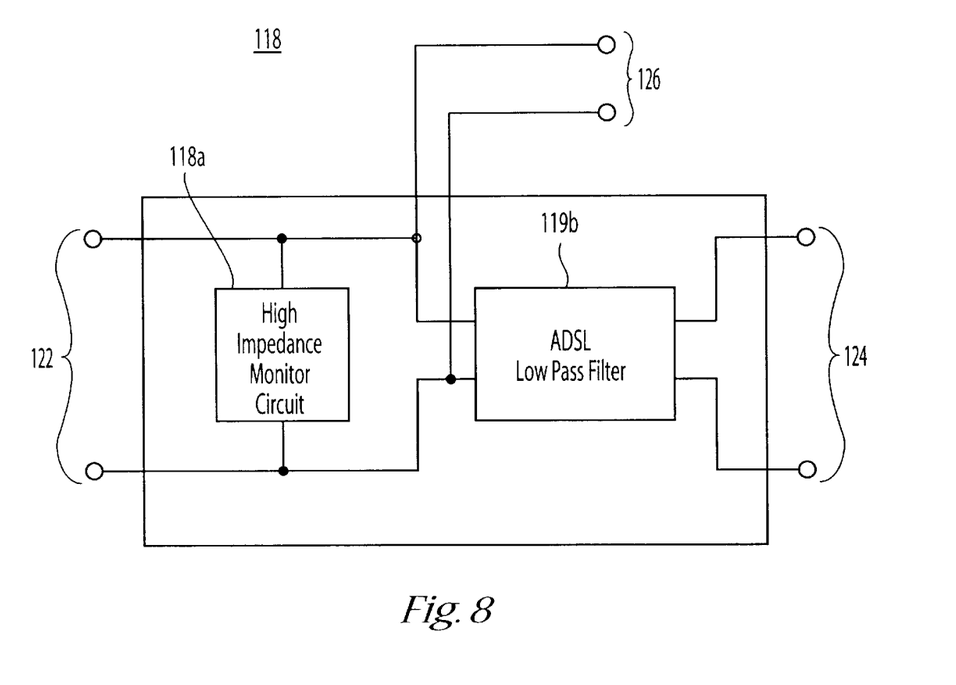
FIG. 8 presents a block diagram of a device of FIG. 7 in the normal mode.

FIG. 8 shows the normal operating mode for the ADSL line tester 118 of the present invention. In the normal operating mode, a high impedance monitor circuit 118a monitors the twisted pair for a battery voltage reversal for two seconds from the central office, as described above with respect to FIG. 3. The twisted pair from the network interface port 122 is thus connected to the twisted pair side of the ADSL low pass filter 119b and also to the ADSL modem port 126.

Upon reception of a voltage reversal condition lasting two seconds, the line tester 118 switches into a test mode having two phases.

Figure 9:
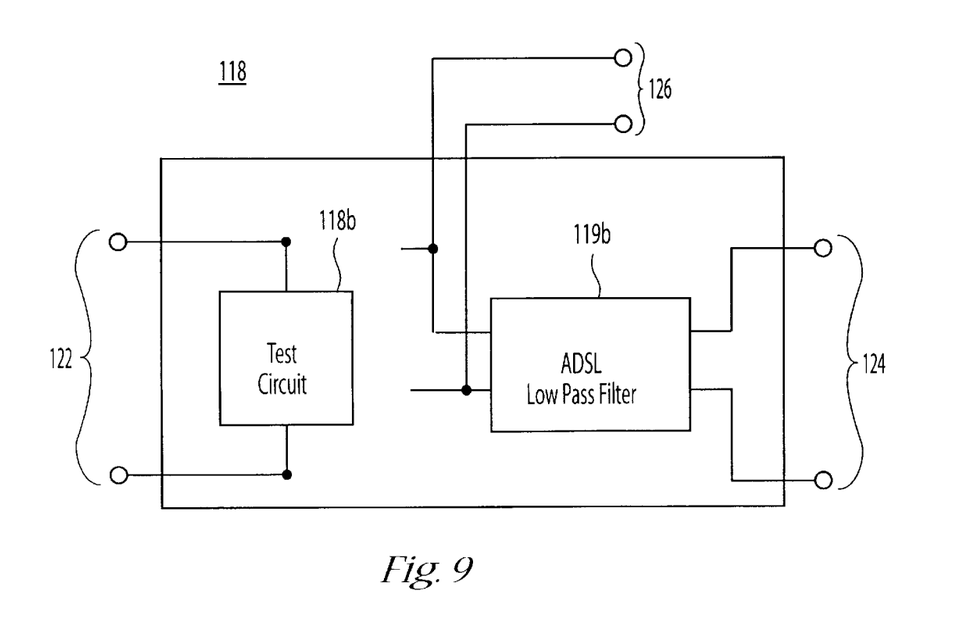
FIG. 9 presents a block diagram of a device of FIG. 7 in the first phase of the test mode.

FIG. 9 shows a block diagram of the effective circuit during the first phase of the test mode. In the first phase of the test mode, the ADSL low pass filter 119b and the ADSL modem 128 are isolated and a test circuit 118b is activated. The test circuit 118b, in which a test signal is sent back to the central office as described above with reference to the test signal generator 36 of FIG. 5, allows the central office to check the twisted pair between the central office and the customer's premises. This first phase lasts for a first predetermined period of time. Preferably, the first predetermined period of time lasts 30 seconds, although a wide range of test signal times may be employed, as discussed above with respect to timer U1. At the end of the first predetermined period of time, the line tester 118 exits the first phase of the test mode and enters the second phase.

Figure 10:
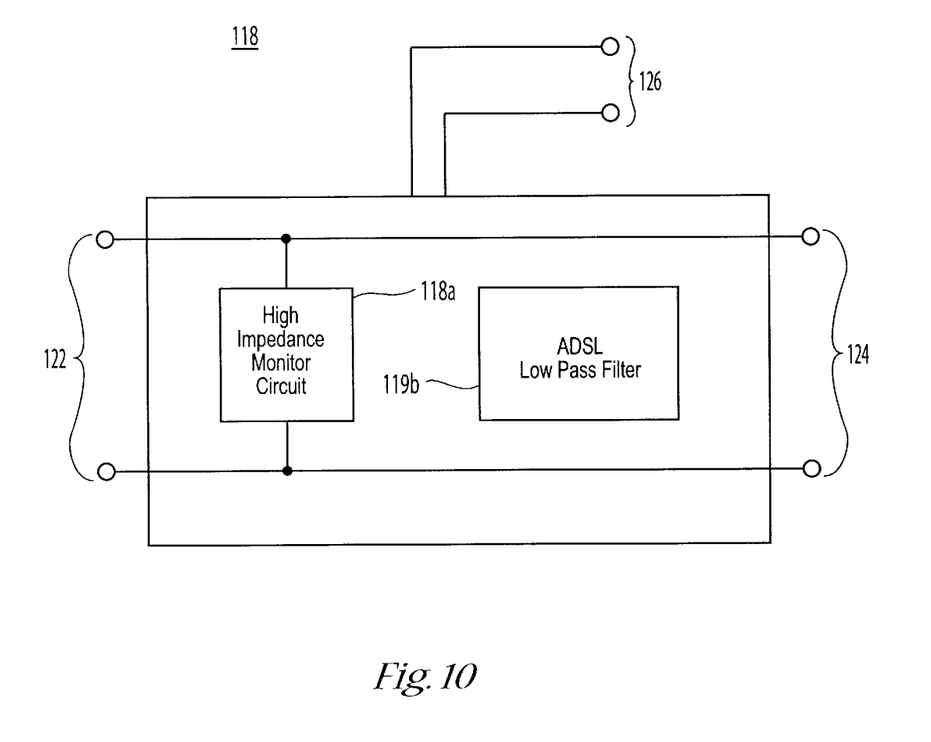
FIG. 10 presents a block diagram of a device of FIG. 7 in the second phase of the test mode.

FIG. 10 shows a block diagram of the effective circuit during the second phase of the test mode. In the second phase, the network interface port 122 is directly connected to the customer POTS port. This is preferably done by bypassing the ADSL low pass filter 119b and disconnecting the ADSL modem 128. The second phase lasts for a second predetermined period of time which, in the preferred embodiment, lasts for about 3 minutes, although this duration may be adjusted to any desired value, as discussed below. During the second phase of the test mode, the central office can send one or more signals to test the customer's POTS equipment without worrying about the effects of the ADSL low pass filter or the ADSL modem.

Together, the two test phases help the central office diagnose problems with a subscriber's service. In the first test phase, the twisted pair line is tested to establish a base line. The second test phase, which uses the twisted pair line, provides measurements about the already-tested twisted pair in series with the customer's POTS equipment. The just-measured characteristics of the twisted pair can then be "backed out" of the system response of the twisted-pair/customer POTS taken together, so as to evaluate or diagnose customer equipment. For instance, in the second phase of the test mode, the central office may simply look for capacitance on the line to see whether the customer's phone is hooked. Diagnostics of other sorts may also be performed, especially in those cases where the customer's telephones can intelligently respond to query signals sent by the central office during the second phase of the test mode.

Figure 11A:
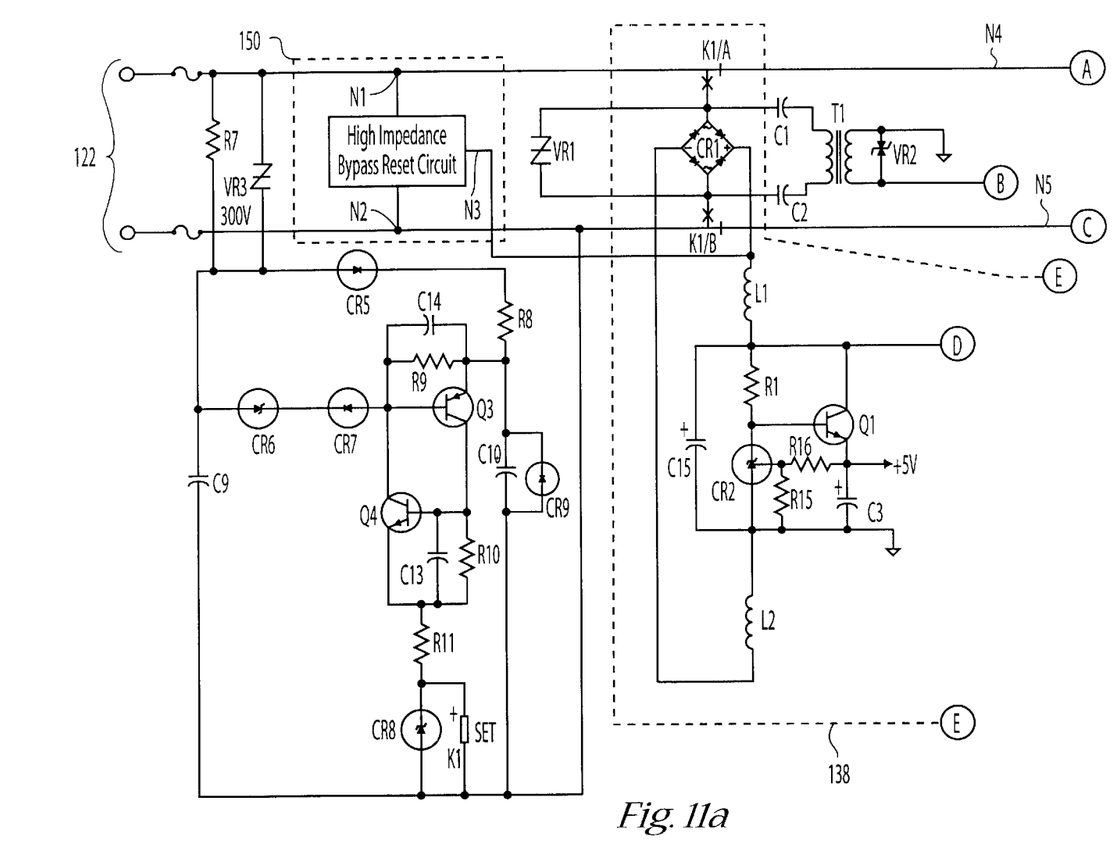
FIG. 11 presents a detailed diagram of the network interface unit in accordance with the present invention.
Figure 11B:
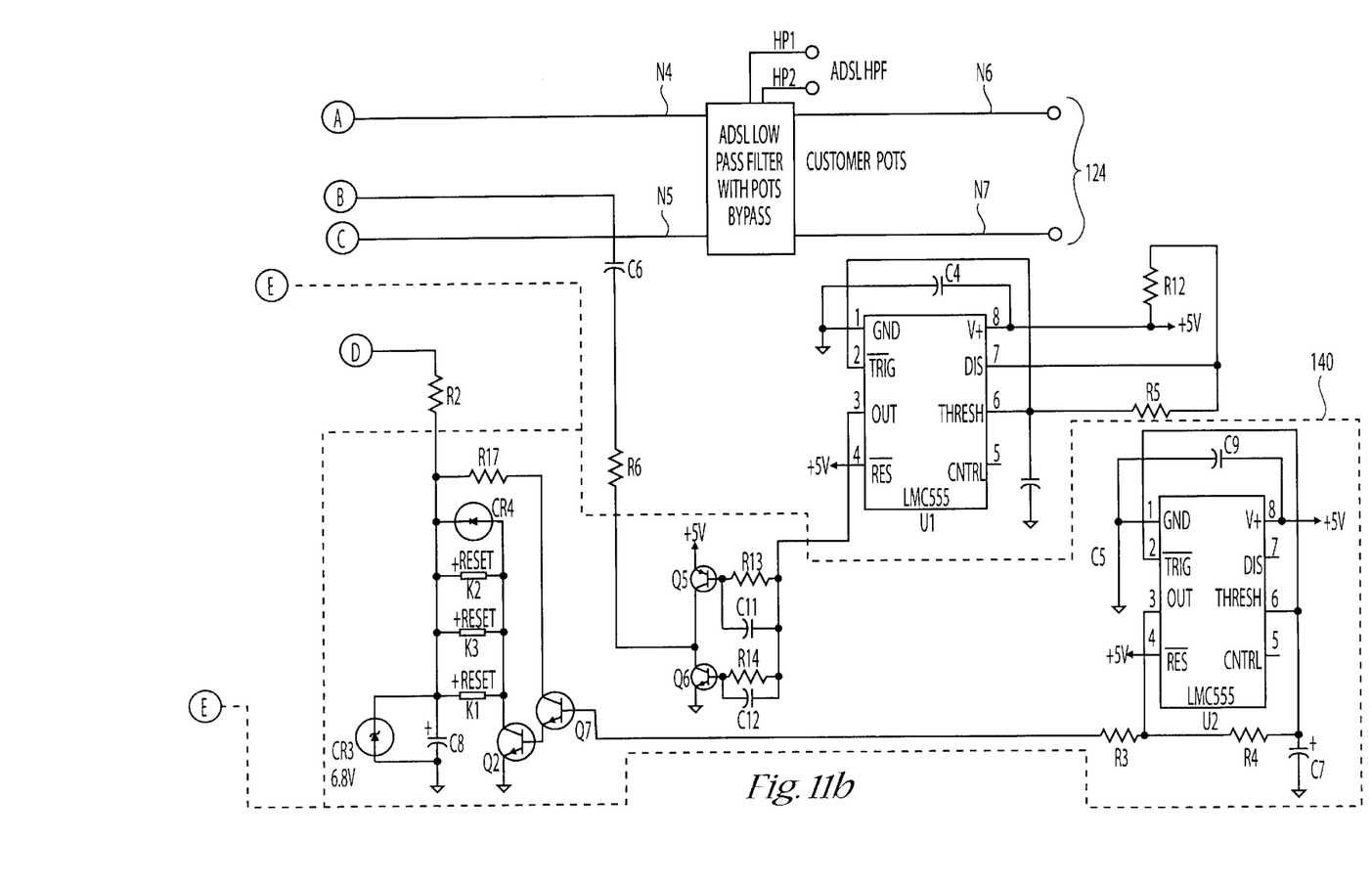

FIG. 11 presents a detailed circuit diagram of the ADSL line tester 118. The ADSL line tester 118 of FIG. 11 is similar to that shown in FIG. 5, but also includes a 300 V voltage protection circuit VR3 connected across the network interface port, a high impedance bypass reset circuit 150 having nodes N1 and N2 connected to the two terminals of the network interface port 122 (and thus to the tip & ring lines, respectively), and a node N3 receiving a signal from the top of inductor L1. The ADSL line tester also includes the bypass circuitry for selectively bypassing the ADSL low pass filter 119b, as discussed in FIG. 7. In addition to the foregoing differences from the circuit of FIG. 5, the circuit of FIG. 11 also includes minor differences in the power subcircuit 138 and the reset subcircuit 140.

In the circuit of FIG. 11, the power subcircuit 138 preferably outputs a supply voltage of +5 volts. This contrasts with the preferred supply voltage of +2 volts used in the circuit of FIG. 5. To put out a supply voltage of +5 volts, the power subcircuit of FIG. 11 has R15 and R16 connected between the emitter of Q1 and ground. Since CR2 provides a 2.5 volt reference across R15, and since R16 is the same as R15, the voltage at Q1's emitter, from where the supply voltage is taken, is maintained at +5 volts. It should be kept in mind, however, that many alternate approaches may be taken to provide the desired output voltage, and that other output voltages may be provided by appropriate choices for R15 and R16. In addition to R15, R16, the power subcircuit of FIG. 11 also includes capacitor C15. Capacitor C15 helps filter out the 300 KHz (or other) test signal which is coupled back into the twisted pair during the test mode.

In the circuit of FIG. 11, the reset circuit 140, too, differs somewhat from the reset circuit 40 shown in FIG. 5. First, reset circuit 140 uses a second transistor Q7 whose emitter is connected to the base of Q2. This arrangement helps increase the current flow through Q2, so as to reliably reset all three dual contact relays K1, K2 and K3, when U2 times out, preferably after 30 seconds as discussed above. The reset circuit 140 also includes current limiting resistor R17 connected to the collector Q7 for protection.

Figure 12:
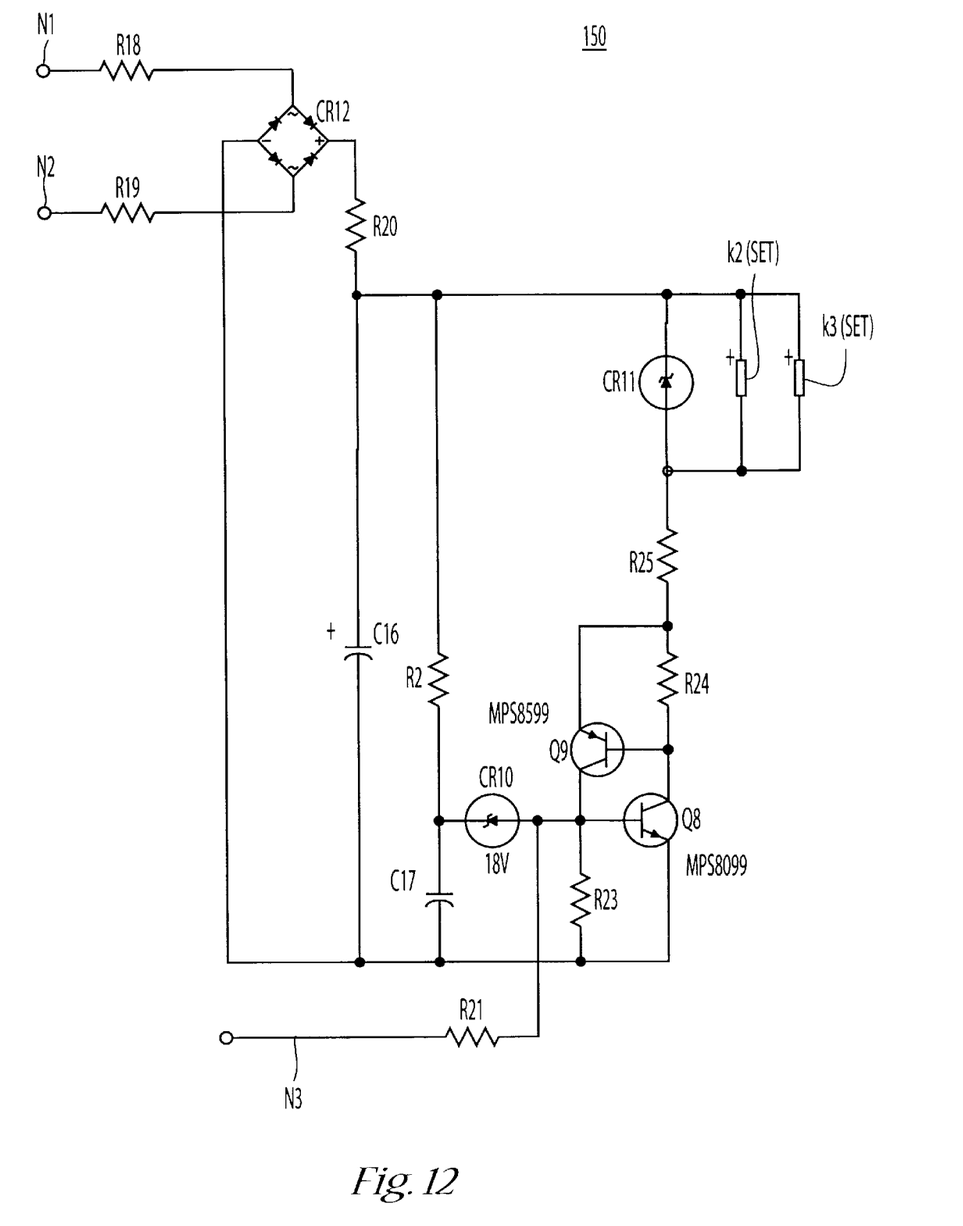
FIG. 12 presents a circuit diagram of the high impedance bypass circuit of the network interface unit of FIG. 11.

FIG. 12 shows a detailed diagram of the high impedance bypass reset circuit 150 of FIG. 11. The bypass circuit 150 is connected across the network interface port at nodes N1, N2 in series with resistors R18 and R19, respectively. The bypass circuit 50 also receives an input from the power circuit 138 via node N3.

When the circuit of FIG. 11 is in the normal operating mode (no testing), node N3 floats and capacitor C16 charges via resistors R18, R19 and R20 and C17 charges via resistor R22. C16 charges for a predetermined period of time which depends on the particular values of C16 R18, R19 and R20, until the voltage across CR10 exceeds the breakdown voltage, which is preferably about 18 V. When the breakdown voltage of CR10 is exceeded, transistor Q8 turns on, causing transistor Q9 to turn on, resulting in a latch with Q8. With Q8 on, current flows through Zener diode CR11, and resistors R25, R24 and relays K2 and K3 receive a Set signal, maintaining them in the "no bypass" condition. Under these conditions, capacitor C16 discharges through resistors R22 and R23. After discharging to a sufficient degree, Q8 shuts off, capacitor C16 charges up again and the cycle is repeated. Therefore, as the line tester is in the normal operating mode, C16 constantly charges and then discharges via CR10.

When the circuit of FIG. 11 enters the first phase of the test mode, inductor L1 is active, relay K1 is reset (enter test mode), and node N3 is high. With node N3 high, the base of Q8 is forward biased and so Q8 turns on, thereby turning on Q9, and current flows through CR11, R25 and R24, as before. Q8 stays on so long as node N3 is high — i.e., until K1 is reset by reset circuit 140 — about 30 seconds after entering the first phase of the test mode. Until K1 is reset, capacitor C16 cannot charge since Q8 is conducting and current flows through R5.

After the 30 second long first phase of the test mode, relay K1 is reset, and so are relays K2 and K3. Resetting relays K2 and K3 results in a bypass of the ADSL low pass filter 119b, thereby enabling the second phase of the test mode. Soon after K1 is reset, node N3 floats, causing Q8 and Q9 turn off. At this instant, capacitor C16 is still discharged. However, with Q8 and Q9 off, the base of Q8 floating, and R5 no longer conducting, capacitor C16 begins to charge once again. Capacitor C16 charges until there is sufficient voltage to cause CR10 to conduct and turn on Q8 once again. After Q8 turns on, Q9 also turns on, current flows through R25 and relays K2 and K3 are set, returning the ADSL line tester 118 to the normal operating mode. Thus, the second phase of the test mode lasts from the time that node N3 floats and Q8 turns off with relays K2 and K3 reset (in bypass) until the relays are set when Q8 begins conducting once again. With the preferred values of R20 and C16, the second phase of the test mode lasts about 3 minutes.

Figure 13:
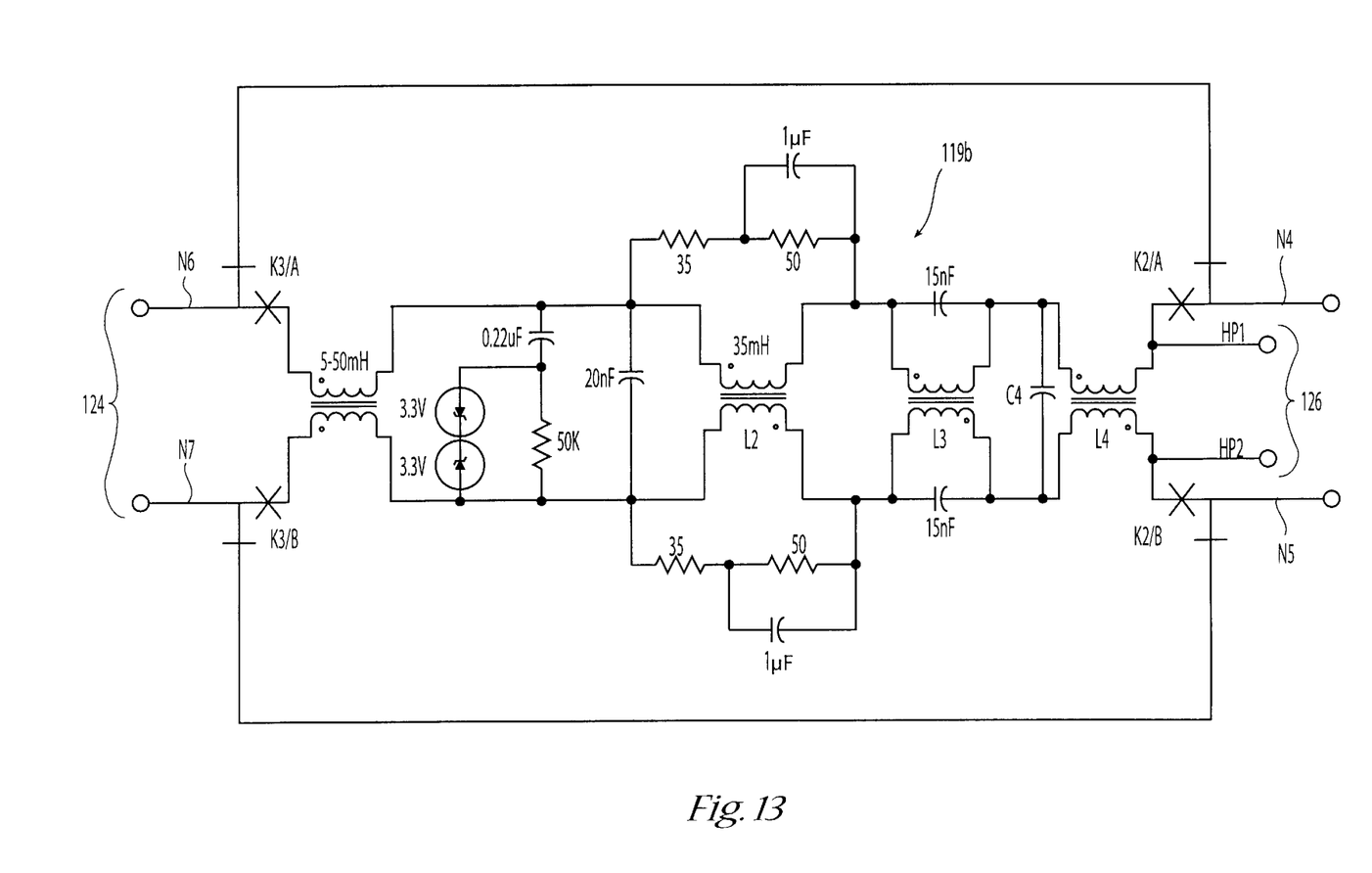
FIG. 13 presents the bypass circuitry for a lowpass POTS filter.

FIG. 13 shows the preferred embodiment of the ADSL low pass filter 119b, which is bypassed during the second phase of the test mode. The ADSL low pass filter is further described in commonly owned U.S. application Ser. No. 09/083,162, whose contents are incorporated by reference to the extent necessary to understand the present invention. During the second phase of the test mode, relays K2 and K3 are reset, thereby bypassing the ADSL low pass filter and the ADSL modem port 126. This allows one to test customer's POTS equipment connected to customer POTS port 124 from the central office. Tables 3 and 4 present the values for the various components found in FIGS. 11–13, excepting those which are identical in FIG. 5.

TABLE 3

Component Values for Inductors, Resistors & Capacitors in FIGS. 11–13 (excepting those identical in the circuit of FIG. 5)

| COMPONENT | VALUE |
| --- | --- |
| R15, R16 | 10 KΩ |
| R17 | 1 KΩ |
| R18, R19 | 665 KΩ |
| R20 | 665 KΩ |
| R21 | 100 KΩ |
| R22 | 100 KΩ |
| R23 | 80 KΩ |
| R24 | 14 KΩ |
| R25 | 50 Ω |
| C15 | 10 uF |
| C16 | 200 uF |
| C17 | 0.47 uF |

TABLE 4

Components in FIGS. 11–13 (excepting those identical in the circuit of FIG. 5)

| COMPONENT | DESCRIPTION |
| --- | --- |
| CR3, CR8 | 6.8 V Zener |
| CR10 | 18 V Zener |
| CR11 | 6.8 V Zener |
| CR12 | KB204G from Diodes, Inc. |
| VR3 | 300 V |
| K2, K3 (dual relay) | TQ2E-L2-3V from Aromat |
| Q7 | MPS8099 from Motorola |
| Q8 | MPS8099 from Motorola |
| Q9 | MPS8599 from Motorola |

The devices described above may be implemented on a printed circuit board using discrete components and portions may even be implemented as an application-specific integrated circuit (ASIC). In addition, as is known to those skilled in the art, portions of the signal generator circuit and reset control circuit, among other components of the device, can be replaced by a microprocessor or other programmable unit, albeit at greater expense, using current technology.

Therefore, while the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. A method of remotely testing customer equipment from a central office, the central office being connected to the customer equipment via a twisted pair transmission line and a network interface device including at least one xDSL filter, with the customer equipment being connected in electrical series with the at least one xDSL filter during normal operation, the method comprising:

applying a request signal along the twisted pair transmission line to invoke a test mode;

in response to the request signal, automatically isolating from the twisted pair transmission line, the at least one xDSL filter, the customer equipment and a port connectable to an xDSL modem;

sending a first test signal via the twisted pair transmission line back to the central office to thereby test the twisted pair transmission line while it is disconnected from the at least one xDSL filter, the customer equipment and the port, during a line test phase; and automatically bypassing the at least one xDSL filter such that the twisted pair transmission line remains connected to the customer equipment, and testing the customer equipment while the customer equipment is unaffected by the at least one xDSL filter and the port, during a customer equipment test phase.

2. A network interface device operable in one of a normal monitor mode and a test mode having a line test phase and a customer equipment test phase, said network interface device configured to interface a twisted pair transmission line to customer equipment in a communication system, said network interface device comprising:

a first port comprising first and second terminals establishing respective first and second voltage nodes;

a second port comprising third and fourth terminals selectively connected to respective first and second terminals via respective first and second switches, said second port being connected to the first port when the device is in the monitor mode and also in the customer equipment test phase, and being disconnected from the first port when the device is in the line test phase;

a third port connected to the first port when the device is in the monitor mode and being disconnected from the first port when the device is in the test mode;

at least one xDSL filter situated between the first and second switches, and the second port;

a detector circuit connected in electrical parallel across said first and second voltage nodes and configured to detect a request signal, said detector circuit being further configured to output a first control signal to said first and second switches upon detection of said request signal, to thereby place the de vice in the test mode;

a power supply circuit connected to said first port via said first and second switches, and arranged to output a DC supply voltage when the device is in the test mode, said power supply circuit being powered by a voltage applied across the first and second voltage nodes;

a signal generator circuit coupled to said first port via said first and second switches, and configured to output a predetermined test signal to said first port for a predetermined first period of time, when the device is in the line test phase, said signal generator circuit being powered by said DC supply voltage from said power supply circuit; and a bypass circuit configured to allow a signal passing between the first and second ports to bypass the at least one xDSL filter during the customer equipment test phase.

3. The method of claim 1, wherein the step of applying a request signal comprises reversing the office battery voltage.

4. The method of claim 1, wherein the xDSL filter is an xDSL lowpass filter.

5. The method of claim 1, wherein the port is connected to an xDSL modem.

6. The device of claim 2, wherein the request signal to which the detector circuit responds, comprises a polarity reversal of the office battery voltage.

7. The device of claim 2, wherein the xDSL filter is an xDSL lowpass filter.

8. The device of claim 2, wherein the third port is isolated from the first port during both the line test phase and the customer equipment test phase.

9. The device of claim 2, wherein the bypass circuit electrically isolates the xDSL filter from both the first port and the second port, during the customer equipment test phase.

10. The device of claim 2, wherein the bypass circuit comprises a pair of dual relays, a first pair connected between the first and second switches and the filter, and a second pair connected between the filter and the second port.

11. A network interface device operable in one of a normal monitor mode and a test mode having a line test phase and a customer equipment test phase, said network interface device configured to interface a twisted pair transmission line to customer equipment in a communication system, said network interface device comprising:

a first port comprising first and second terminals establishing respective first and second voltage nodes;

a second port comprising third and fourth terminals selectively connected to respective first and second terminals via respective first and second switches, said second port being connected to the first port when the device is in the monitor mode and also in the customer equipment test phase, and being disconnected from the first port when the device is in the line test phase;

a third port connected to the first port when the device is in the monitor mode and being disconnected from the first port when the device is in the test mode;

at least one xDSL filter situated between the first and second switches, and the second port;

a detector circuit connected in electrical parallel across said first and second voltage nodes and configured to detect a request signal, said detector circuit being further configured to output a first control signal to said first and second switches upon detection of said request signal, to thereby place the device in the test mode; and a bypass circuit configured to allow a signal passing between the first and second ports to bypass the at least one xDSL filter during the customer equipment test phase.

12. A network interface device operable in one of a normal monitor mode and a test mode having a line test phase and a customer equipment test phase, said network interface device configured to interface a twisted pair transmission line to customer equipment in a communication system, said network interface device comprising:

a first port configured to connect to a twisted pair transmission line;

a second port connected to the first port when the device is in the monitor mode and also in the customer equipment test phase, and being disconnected from the first port when the device is in the line test phase;

a third port connected to the first port when the device is in the monitor mode and being disconnected from the first port when the device is in the test mode;

at least one xDSL filter situated between the first port and the second port;

a detector circuit connected to terminals of the first port and configured to detect a request signal sent along the twisted pair transmission line, said detector circuit being further configured to place the device in the test mode, in response to the request signal; and a bypass circuit configured to allow a signal passing between the first and second ports to bypass the at least one xDSL filter during the customer equipment test phase.

13. The device of claim 12, wherein the request signal to which the detector circuit responds, comprises a polarity reversal of the office battery voltage.

14. The device of claim 12, wherein the xDSL filter is an xDSL lowpass filter.

15. The device of claim 12, wherein the third port is isolated from the first port during both the line test phase and the customer equipment test phase.

16. The device of claim 2, wherein the bypass circuit electrically isolates the xDSL filter from both the first port and the second port, during the customer equipment test phase.

17. The device of claim 12, wherein the bypass circuit comprises a pair of dual relays, a first pair connected between the first port and the filter, and a second pair connected between the filter and the second port.

* * * * *